(12) United States Patent
Zhang et al.

(10) Patent No.: US 12,300,949 B2
(45) Date of Patent: May 13, 2025

(54) LAMP SOCKET ASSEMBLY FOR POWERING AN IMAGE CAPTURE DEVICE OF A SECURITY SYSTEM

(71) Applicant: Wyze Labs, Inc., Kirkland, WA (US)

(72) Inventors: Chao Zhang, Kenmore, WA (US); Steve Skeoch, Palos Verdes Estates, CA (US); Lin Chen, Seattle, WA (US); Zhongwei Cheng, Redmond, WA (US)

(73) Assignee: WYZE LABS, INC., Kirkland, WA (US)

( * ) Notice: Subject to any disclaimer, the term of this patent is extended or adjusted under 35 U.S.C. 154(b) by 0 days.

(21) Appl. No.: 18/224,310

(22) Filed: Jul. 20, 2023

(65) Prior Publication Data

US 2023/0361520 A1 Nov. 9, 2023

Related U.S. Application Data

(63) Continuation of application No. 17/479,832, filed on Sep. 20, 2021, now abandoned.

(51) Int. Cl.
| | |
|---|---|
| *H01R 33/945* | (2006.01) |
| *G08B 5/36* | (2006.01) |
| *G08B 15/00* | (2006.01) |
| *H01R 33/92* | (2006.01) |
| *H04N 7/18* | (2006.01) |

(52) U.S. Cl.
CPC .......... *H01R 33/9453* (2013.01); *G08B 5/36* (2013.01); *G08B 15/00* (2013.01); *H01R 33/92* (2013.01); *H04N 7/18* (2013.01)

(58) Field of Classification Search
CPC ....... G08B 5/36; G08B 15/00; H01R 33/9453
See application file for complete search history.

(56) References Cited

U.S. PATENT DOCUMENTS

| | | |
|---|---|---|
| 4,823,051 A | 4/1989 | Young |
| 9,107,248 B2 | 8/2015 | Chen |
| 10,909,823 B2 | 2/2021 | Rossi |
| 10,997,837 B1 | 5/2021 | Skotty et al. |
| 11,509,804 B1 | 11/2022 | Tylicki |
| 2020/0213485 A1 | 7/2020 | Rossi |
| 2023/0086995 A1* | 3/2023 | Zhang ................... H04N 7/183 348/143 |

* cited by examiner

*Primary Examiner* — John A Tweel, Jr.
(74) *Attorney, Agent, or Firm* — Davis Wright Tremaine LLP; Heather M. Colburn

(57) ABSTRACT

A lamp socket assembly to be installed in a light socket and receive electrical power therefrom. The lamp socket assembly to provide electrical power to a surveillance device that detects an occurrence of a security event and notifies the lamp socket assembly of the occurrence. In response to the notification, the lamp socket assembly turns on a light bulb.

24 Claims, 8 Drawing Sheets

LAMP SOCKET ASSEMBLY FOR POWERING AN IMAGE CAPTURE DEVICE OF A SECURITY SYSTEM

CROSS REFERENCE TO RELATED APPLICATION(S)

This application is a continuation of U.S. patent application Ser. No. 17/479,832, filed on Sep. 20, 2021, which is incorporated herein by reference in its entirety.

BACKGROUND

Technical Field

The present invention is directed generally to security systems, and more particularly, to devices for powering one or more image capture devices of a security system.

Description of the Related Art

To surveil their homes and/or other assets, people often install security cameras (e.g., outside a house or other building and/or on or near an asset). Such security cameras may be implemented as floodlight cameras, battery powered cameras, and/or wired cameras. Unfortunately, each of these types of security cameras has drawbacks. For example, floodlight cameras are expensive and difficult to install, typically requiring a professional installer. Battery powered cameras need to be recharged from time-to-time, which requires that they be removed, recharged, and reinstalled each time they are recharged. Wired cameras can be difficult to install because power cables and/or electrical wires have to be installed and connected to each of the wired cameras.

BRIEF DESCRIPTION OF THE SEVERAL VIEWS OF THE DRAWING(S)

Various embodiments in accordance with the present disclosure will be described with reference to the following drawings.

Like reference numerals have been used in the figures to identify like components.

DETAILED DESCRIPTION

Figure 1:
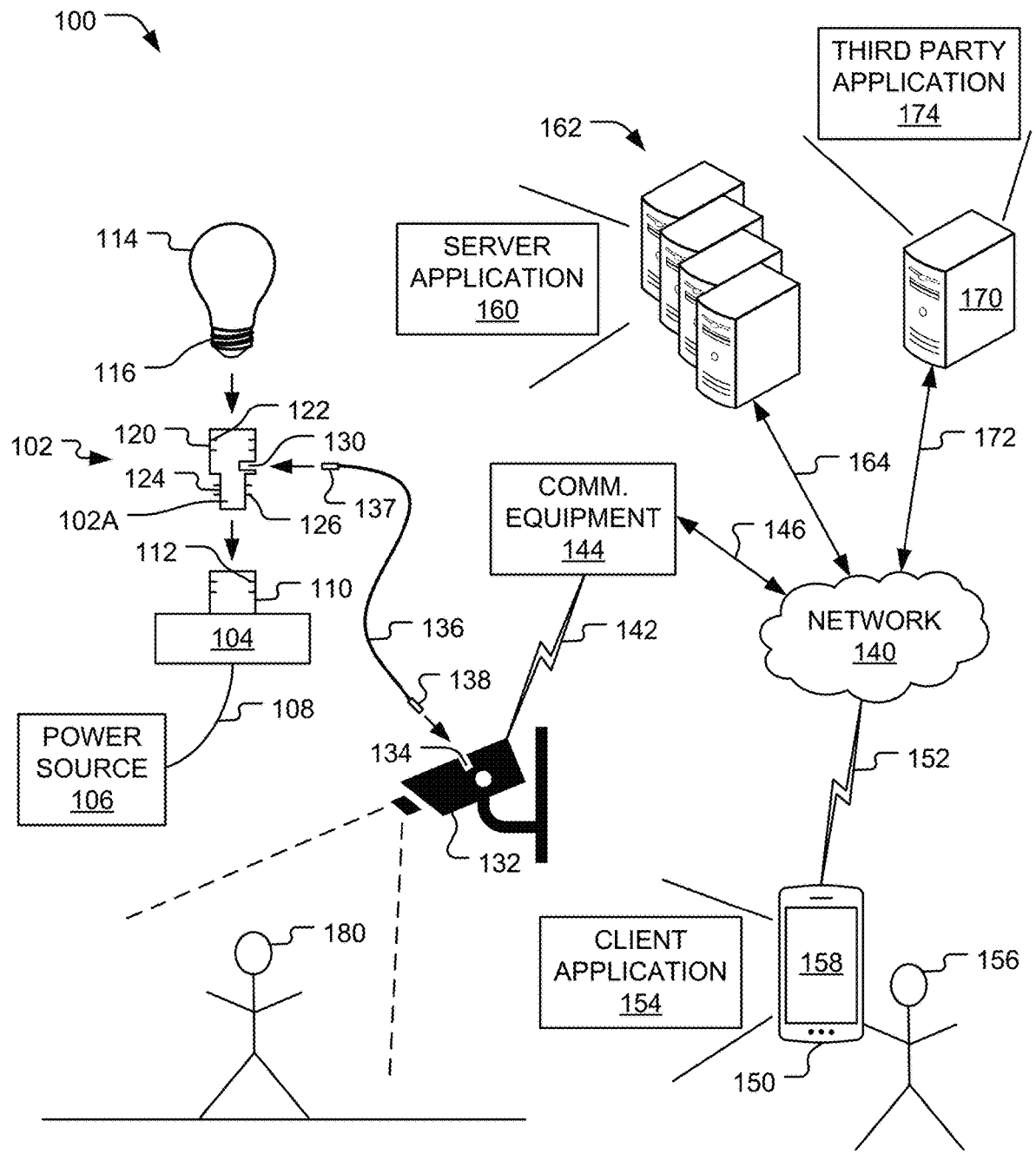
FIG. 1 is a block diagram of a security system that includes an image capture device and one or more lamp socket assemblies each installed in a different light fixture.

FIG. 1 is a block diagram of a security system 100 that includes one or more lamp socket assemblies 102 each for use with a light fixture 104. For ease of illustration, FIG. 1 illustrates a single lamp socket assembly 102A. However, the system 100 may include any number of the lamp socket assembly (ies) 102 each like the lamp socket assembly 102A and each installed in a separate light fixture like the light fixture 104.

The light fixture 104 is connected to a power source 106 and receives power therefrom. For example, the light fixture 104 may be implemented as a conventional outdoor light fixture connected to a conventional electrical socket (not shown) by a power cord or hardwired to an electrical circuit by one or more conventional electrical wires 108. The power source 106 may be an alternating-current ("AC") electric power supply, such as a power grid or mains electricity, or a direct-current ("DC") electric power supply, such as battery power, solar power, and the like. The light fixture 104 includes a light socket 110. In the embodiment illustrated, the light socket 110 has been illustrated as a conventional light socket with conductive internal threads 112. The light socket 110 is configured to receive and power a light bulb 114. In the embodiment illustrated, the light bulb 114 has conductive external threads 116 configured to be threaded into the conductive internal threads 112 of the light socket 110. Power is transferred to the light bulb 114 from the light fixture 104 via a first electrical connection formed between the conductive internal and external threads 112 and 116.

The lamp socket assembly 102A is configured to be positioned in between the light bulb 114 and the light socket 110. The lamp socket assembly 102A includes a light receptacle portion 120 configured to receive and power the light bulb 114. Thus, the light receptacle portion 120 may be substantially similar to the light socket 110. For example, the light receptacle portion 120 may include conductive internal threads 122 that are substantially identical to the conductive internal threads 112 and are configured to threadedly engage the conductive external threads 116 of the light bulb 114. The conductive external threads 116 may be threaded into the conductive internal threads 122 to form a second electrical connection between the light bulb 114 and the light receptacle portion 120 through which power may pass from the light receptacle portion 120 to the light bulb 114. The light receptacle portion 120 may be configured to accommodate any type of light bulb desired.

The lamp socket assembly 102A includes a connector portion 124 configured to be received and powered by the light socket 110. In the embodiment illustrated, the connector portion 124 includes conductive external threads 126 that are substantially identical to the conductive external threads 116 of the light bulb 114 and are configured to be threaded into the conductive internal threads 112 of the light socket 110. The conductive external threads 126 may be threaded into the conductive internal threads 112 to form a third electrical connection between the lamp socket assembly 102A and the light socket 110 through which power may pass from the light socket 110 to the lamp socket assembly 102A. The lamp socket assembly 102A includes circuitry 128 (see FIG. 2) that conducts power from the conductive external threads 126 to the conductive internal threads 122, which provide power to the conductive external threads 116 of the light bulb 114. The connector portion 124 may be configured to be received by any type of lamp socket desired.

The lamp socket assembly 102A includes at least one connector that may each be connected to a different security or surveillance device. In the embodiment illustrated, the lamp socket assembly 102A includes a first connector 130 (e.g., a Universal Serial Bus ("USB") port, a USB plug, and the like) that is connected to an image capture device 132 (e.g., a video camera, a security camera, and the like). However, in alternate embodiments, the lamp socket assembly 102A may include multiple connectors each like the first connector 130 that are each connectable to a different image capture device like the image capture device 132.

The image capture device 132 includes a second connector 134 (e.g., a USB port, a USB plug, and the like) configured to be connected to the first connector 130. In the embodiment illustrated, the second connector 134 of the image capture device 132 is connected to the first connector 130 by a cable 136 (e.g., a USB cable) having first and second connectors 137 and 138. The first connector 137 is configured to be directly connected to the first connector 130 of the lamp socket assembly 102A and the second connector 138 is configured to be directly connected to the second connector 134 of the image capture device 132.

The lamp socket assembly 102A provides electrical power to the image capture device 132 via a fourth electrical connection formed between the first and second connectors 130 and 134. At the same time, the image capture device 132 communicates information to the lamp socket assembly 102A via a communication connection formed between the first and second connectors 130 and 134. The information is used by the lamp socket assembly 102A to control operation of the light bulb 114. The lamp socket assembly 102A and the image capture device 132 may communicate over the communication connection using any suitable communication protocol, such as USB communication protocol. While in the embodiment shown, the first and second connectors 130 and 134 form both the fourth electrical connection and the communication connection between the lamp socket assembly 102A and the image capture device 132, in alternate embodiments, the lamp socket assembly 102A and the image capture device 132 may each include separate connectors for forming each of the fourth electrical connection and the communication connection. The first and second connectors 130 and 134 may be implemented using any type of connectors (e.g., USB) configured to provide electrical and/or communication connections.

In the embodiment illustrated, the image capture device 132 is connected to a network 140 (e.g., the Internet) by a wireless communication link 142 to communication equipment 144 (e.g., a router), which is connected via one or more wired and/or wireless connections 146 to the network 140. The image capture device 132 may communicate with one or more computing devices, such as a client computing device 150, over the network 140.

The client computing device 150 may be connected to the network 140 via a wired or wireless connection 152. The client computing device 150 may implement a client application 154 that receives data from the image capture device 132 via the network 140. For example, the client computing device 150 may receive images and/or sound from the image capture device 132, and display the images to a user 156 using a display device 158 of the client computing device 150 and/or playback the sound to the user 156 using sound reproduction equipment of the client computing device 150. The client application 154 may also send messages (e.g., data, notifications, commands, instructions, and the like) to the image capture device 132 over the network 140. The client computing device 150 may be implemented as any type of computing device, such as a cellular telephone, tablet computing device, personal computer, laptop computer, and the like. By way of a non-limiting example, the client computing device 150 may be implemented as a mobile communication device 600 (see FIG. 6) or a computing device 12 (see FIG. 7). The system 100 may include any number of client computing devices each like the client computing device 150 and each connected to the network 140 via a separate wired or wireless connection like the connection 152 and each implementing a copy of the client application 154.

Data being communicated to and/or from the image capture device 132 may be communicated to a cloud or server application 160 executing on one or more computing devices 162 connected to the network 140 via one or more wired and/or wireless connections 164. In such embodiments, the server application 160 receives the data (e.g., images and/or sound) from the image capture device 132 and provides the data to the client computing device 150. Similarly, the server application 160 may receive the data (e.g., messages, schedule data, and the like) from the client computing device 150 and provide the data to the image capture device 132.

One or more third-party computing devices 170 may be connected to the network 140 via one or more wired and/or wireless connections 172. The third-party computing device(s) 170 may implement a third-party application 174 that sends instructions to the image capture device 132 over the network 140. Optionally, the third-party application 174 may communicate with the image capture device 132 via the server application 160. The third-party application 174 may communicate with the image capture device 132 using a protocol and/or service, such as one or more If This Then That ("IFTTT") services or other cross-device protocol(s).

Figure 2:
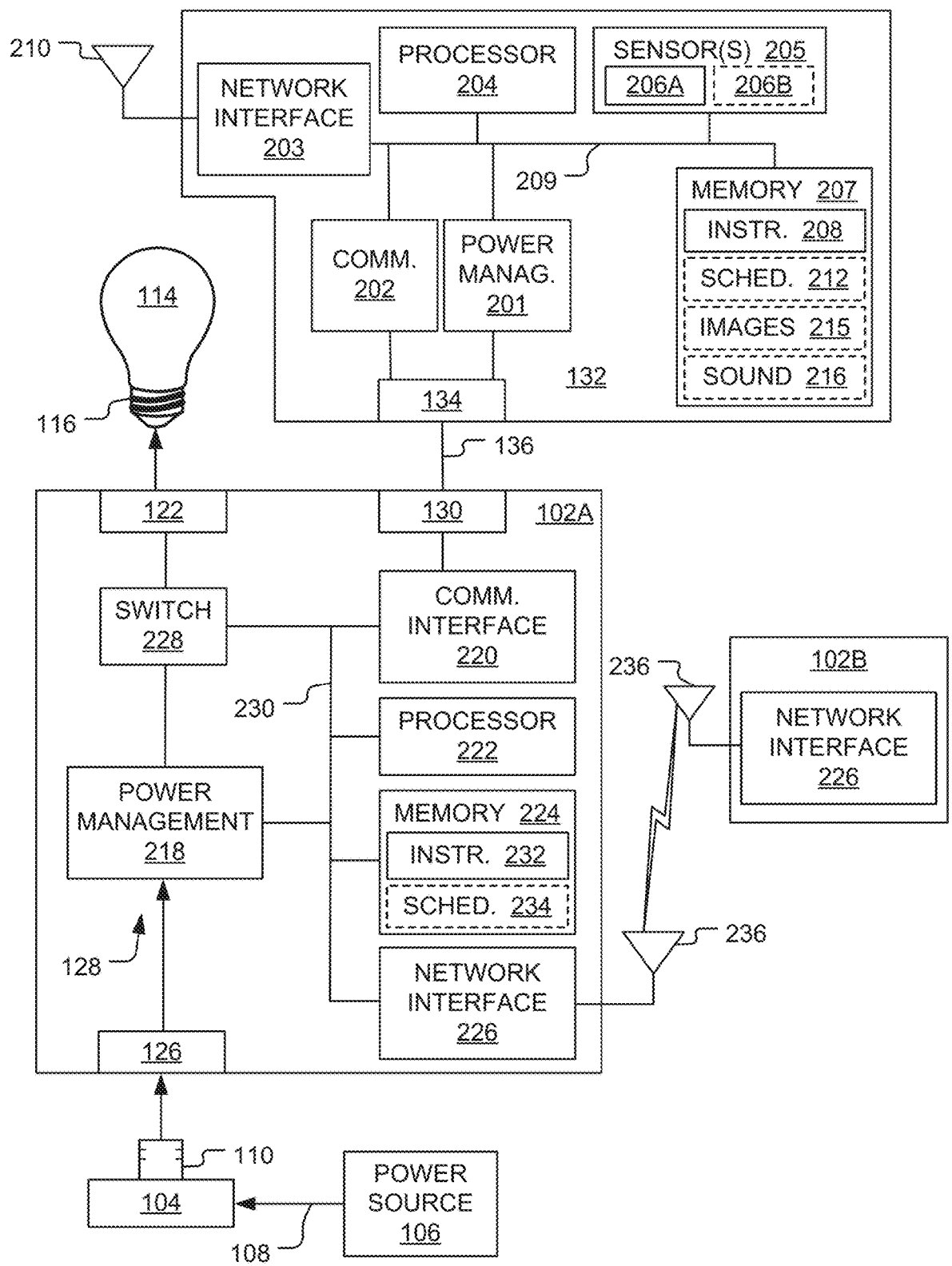
FIG. 2 is a block diagram illustrating some of the internal components of two of the lamp socket assemblies and the image capture device of the security system of FIG. 1.

Referring to FIG. 2, the image capture device 132 includes power management circuitry 201, a communication interface 202, a network interface 203, a processor 204, one or more sensors 205, and memory 207 storing instructions 208 that are executable by the processor 204. The processor 204 is connected to the communication interface 202, the network interface 203, the sensor(s) 205, and the memory 207 by a bus 209. The power management circuitry 201 is connected to and receives power from the second connector 134. Thus, the power management circuitry 201 is connected to the fourth electrical connection formed between the first and second connectors 130 and 134 and receives power therefrom. The power management circuitry 201 is connected to and provides power to the other components of the image capture device 132. The power management circuitry 201 may be connected to the bus 209 and may provide power thereto.

The communication interface 202 includes circuitry connected to the second connector 134 and communicates with the lamp socket assembly 102A over the communication connection formed between the first and second connectors 130 and 134. The communication interface 202 may receive messages from the processor 204 and communicate them to the lamp socket assembly 102A over the communication connection.

The network interface 203 includes circuitry configured to connect to the network 140 (see FIG. 1). In the embodiment illustrated, the image capture device 132 includes an antenna 210 configured to connect wirelessly with the network 140. The network interface 203 is configured to communicate with the network 140 using the antenna 210. The network interface 203 may receive messages from the processor 204 and communicate them to a device (e.g., the client computing device 150, at least one of the computing device(s) 162, and/or at least one of the third-party computing device(s) 170) over the network 140. The network interface 203 may receive messages from another device (e.g., the client computing device 150, at least one of the computing device(s)

162, and/or at least one of the third-party computing device(s) 170) over the network 140 and provide those messages to the processor 204 and/or store the messages in the memory 207. The processor 204 may use the communication interface 202 to forward any message received to the lamp socket assembly 102A and/or may formulate a new message (e.g., based on any received message(s)) to forward to the lamp socket assembly 102A using the communication interface 202.

The processor 204 may be implemented as a microprocessor, microcontroller, and the like. Referring to FIG. 1, the processor 204 is configured to execute the instructions 208 (see FIG. 2), communicate with the lamp socket assembly 102A via the communication interface 202 (see FIG. 2), and communicate with a device (e.g., the client computing device 150, at least one of the computing device(s) 162, and/or at least one of the third-party computing device(s) 170) on the network 140 via the network interface 203 (see FIG. 2).

The sensor(s) 205 monitor a region and may include image capture components 206A, optional sound capture components 206B, one or more motion sensors, one or more passive infrared ("PIR") sensors, and the like. The image capture components 206A capture images of the monitored region. The image capture components 206A may continuously or intermittently capture the images. The captured images may be stored in the memory 207 as image data 215. The optional sound capture components 206B may include a microphone. The optional sound capture components 206B record sound within the monitored region. The recorded sound may be stored in the memory 207 as sound data 216. The motion sensor(s) detect motion within the monitored region.

Referring to FIG. 2, the memory 207 may include read only memory and/or random access memory. The memory 207 may be implemented as one or more non-transitory computer-readable media. As mentioned above, the memory 207 stores the instructions 208, which, when executed by the processor 204, cause the processor 204 to detect a security event in data collected by the sensor(s) 205. For example, the processor 204 may detect the occurrence of a security event when the processor 204 detects at least a threshold amount of motion, at least a threshold amount of noise, and/or the like. By way of a non-limiting example, the processor 204 may detect a security event in the image data 215 and/or the sound data 216. The threshold amount of motion and/or the threshold amount of noise may indicate the presence of an intruder 180 and/or the occurrence of another type of security event. The instructions 208 may include artificial intelligence, machine learning algorithms, and the like that look and/or listen for and detect such security events. Non-limiting examples of security events that may be detected include at least the threshold amount of motion, at least the threshold amount of noise, absence of an object, and/or presence of an object, such as a pet, a vehicle, a package, and the like.

In addition to the instructions 208, the memory 207 may store schedule data 212 (e.g., received from the client computing device 150 illustrated in FIG. 1). The instructions 208 may cause the processor 204 to read the schedule data 212 and instruct the lamp socket assembly 102A to turn the light bulb 114 on and off in accordance with a schedule defined by the schedule data 212. Alternatively, the instructions 208 may cause the processor 204 to forward the schedule data 212 to the lamp socket assembly 102A as schedule data 234 via the communication connection formed between the first and second connectors 130 and 134.

The lamp socket assembly 102A may include power management circuitry 218, a communication interface 220, at least one processor 222, memory 224, a network interface 226, and a switch 228. The switch 228 may optionally be a component of the power management circuitry 218. The processor(s) 222 is/are connected to the communication interface 220, the memory 224, the network interface 226, and the switch 228 by a bus 230. The power management circuitry 218 may be connected to the bus 230 and may provide power thereto. The power management circuitry 218 receives first electrical power from the conductive external threads 126 and provides second electrical power to other components of the lamp socket assembly 102A, such as the processor(s) 222, the communication interface 220, the memory 224, the network interface 226, the switch 228, and the bus 230. When the switch 228 is in an on position, the power management circuitry 218 provides third electrical power to the light bulb 114 that turns on the light bulb 114. On the other hand, when the switch 228 is in an off position, the power management circuitry 218 is prevented from providing the third electrical power to the light bulb 114, which causes the light bulb 114 to be turned off.

The communication interface 220 includes circuitry connected to the first connector 130 and communicates with the image capture device 132 over the communication connection formed between the first and second connectors 130 and 134. The communication interface 220 may receive messages from the image capture device 132 over the communication connection and communicate those messages to the processor(s) 222. When those messages include a notification or command to turn on the light bulb 114, the processor(s) 222 may instruct the switch 228 to be in the on position to thereby provide electrical power to the light bulb 114 and turn on the light bulb 114. In other words, the processor(s) 222 may transition the switch 228 to the on position if the switch 228 was in the off position. After a predetermined amount of time, the processor(s) 222 may instruct the switch 228 to stop providing the electrical power to the light bulb 114 to thereby turn off the light bulb 114. In other words, the processor(s) 222 may transition the switch 228 from the on position to the off position.

The processor(s) 222 may each be implemented as a microprocessor, microcontroller, and the like. The memory 224 may include read only memory and/or random access memory. The memory 224 may be implemented as one or more non-transitory computer-readable media. The memory 224 stores instructions 232 that are executable by the processor(s) 222. The processor(s) 222 is/are configured to execute the instructions 232 (see FIG. 2), implement commands received from the image capture device 132, and instruct the switch 228 to transition between the on and off positions. The memory 224 may store the schedule data 234 (e.g., received from the image capture device 132). The instructions 208 may cause the processor(s) 222 to read the schedule data 234 and instruct the switch 228 to turn the light bulb 114 on and off in accordance with the schedule defined by the schedule data 234.

The network interface 226 includes circuitry configured to connect to a like network interface 226 of another lamp socket assembly (e.g., a lamp socket assembly 102B) like the lamp socket assembly 102A. In the embodiment illustrated, the lamp socket assembly 102A includes an antenna 236 configured to connect wirelessly to the antenna 236 of the lamp socket assembly 102B. The network interface 226 of the lamp socket assembly 102A is configured to communicate with the network interface 226 of the other lamp socket assembly 102B via the antennas 236. The network interface 226 of the lamp socket assembly 102A may receive messages from the processor(s) 222 and communicate them to the other lamp socket assembly 102B wirelessly using the antennas 236. The network interface 226 may receive messages from the other lamp socket assembly 102B and provide those messages to the processor(s) 222 and/or store the messages in the memory 224. The processor(s) 222 may use the network interface 226 to forward any message to the other lamp socket assembly 102B and/or receive any message from the other lamp socket assembly 102B.

Figure 5A:
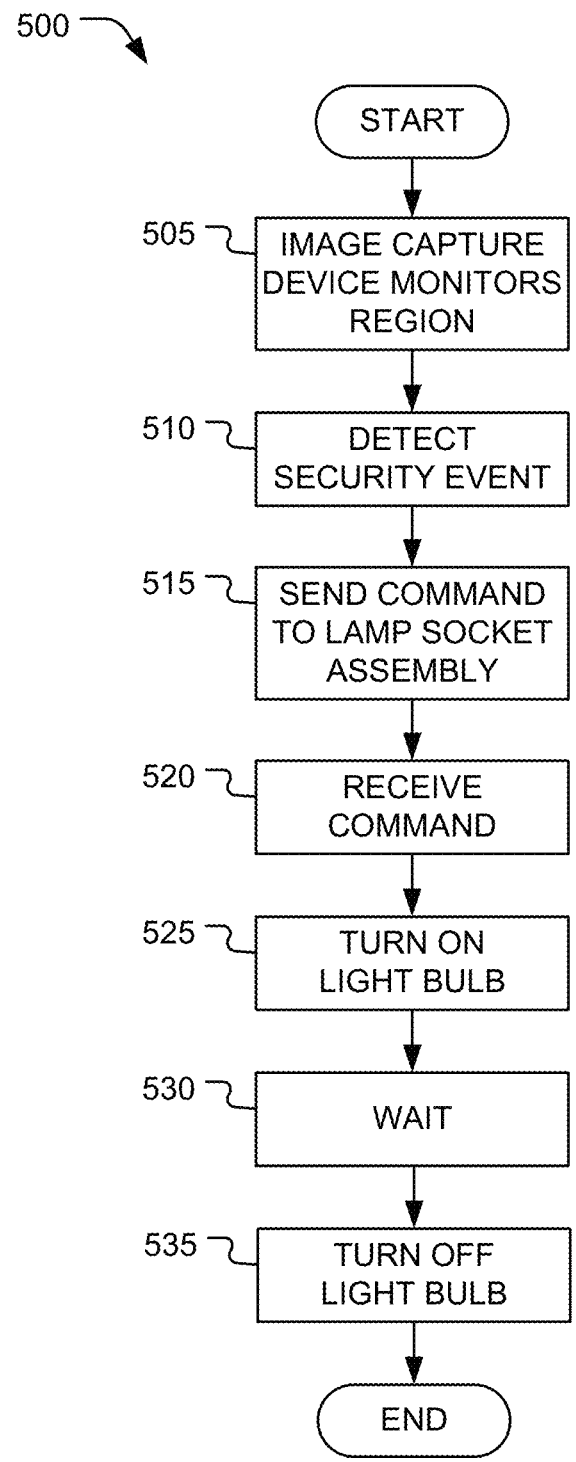
FIG. 5A is a flow diagram of a first method that may be performed by the security system of FIG. 1.

FIG. 5A is flow diagram of a first method 500 that may be performed by the system 100 (see FIG. 1). In first block 505, the image capture device 132 captures images and/or sounds of the region monitored by the image capture device 132, and the instructions 208 (see FIG. 2) cause the processor 204 to look for security events in the image data 215 and/or the sound data 216. As mentioned above, the image data 215 and/or the sound data 216 may be stored in the memory 207 (see FIG. 2).

In block 510, the processor 204 detects a security event in the image data 215 and/or the sound data 216. After the processor 204 detects the security event, in block 515, the instructions 208 cause the processor 204 to send a notification or command to the lamp socket assembly 102A. The command instructs the lamp socket assembly 102A to turn on the light bulb 114. The command may include a predetermined amount of time over which the light bulb 114 is to remain on.

In block 520, the lamp socket assembly 102A receives the command. Then, in block 525, the lamp socket assembly 102A turns on the light bulb 114. In block 525, the instructions 208 may cause the processor 204 to instruct the switch 228 to be in the on position to thereby provide electrical power to and turn on the light bulb 114. Next, in block 530, the lamp socket assembly 102A may wait the predetermined amount of time. Then, in block 535, the lamp socket assembly 102A turns off the light bulb 114. In block 535, the instructions 208 may cause the processor 204 to instruct the switch 228 to be in the off position to thereby stop providing electrical power to and turn off the light bulb 114. Then, the first method 500 terminates. Thus, referring to FIG. 2, the first method 500 (see FIG. 5A) may convert the light fixture 104 into a smart light and/or security light that appears to be turned on by the image capture device 132 whenever the image capture device 132 detects the occurrence of a security event. Further, the lamp socket assembly 102A may be controlled by image detection and/or sound detection implemented by the instructions 208 of the image capture device 132.

Figure 5B:
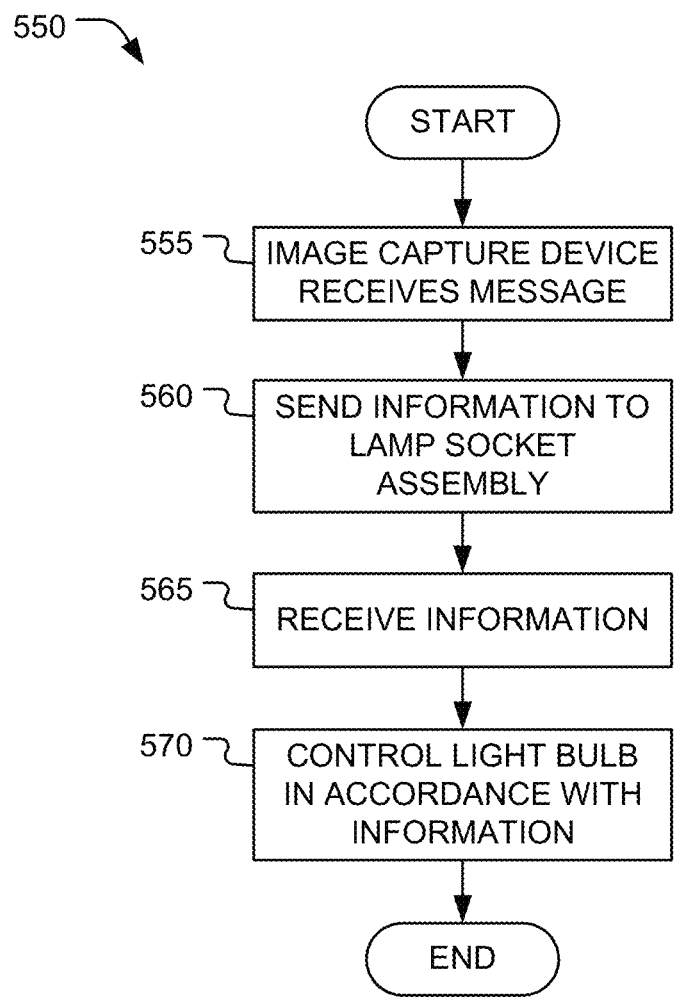
FIG. 5B is a flow diagram of a second method that may be performed by the security system of FIG. 1.

FIG. 5B is flow diagram of a second method 550 that may be performed by the system 100 (see FIG. 1). In first block 555, the image capture device 132 (see FIG. 1) receives a message from another device connected to the network 140 (see FIG. 1). For example, in block 555, the image capture device 132 may receive a message from the client computing device 150, at least one of the computing device(s) 162, or at least one of the third-party computing device(s) 170. The message may include a command and/or the schedule data 212. In block 560, the instructions 208 cause the processor 204 to send information to the lamp socket assembly 102A. The information may include the command and/or the schedule data 212. In block 565, the lamp socket assembly 102A receives the information. Then, in block 570, the lamp socket assembly 102A controls the light bulb 114 in accordance with the information. Then, the second method 550 terminates.

The client application 154 may control the lamp socket assembly 102A by sending the message to the image capture device 132 in block 555. For example, the client application 154 may allow the user 156 to determine a schedule indicating when the user 156 would like the light bulb 114 to be turned on and off. In block 555, the client application 154 communicates the schedule as the schedule data 212 to the image capture device 132 in the message. The image capture device 132 stores the schedule data 212 in the memory 207. In block 560, the instructions 208 when executed by the processor 204 cause the processor 204 to read the schedule data 212 and send the information (e.g., a notification or command) to the lamp socket assembly 102A when the schedule data 212 indicates the light bulb 114 should be turned on. The lamp socket assembly 102A receives the information in block 565. Then, in block 570, the lamp socket assembly 102A turns on the light bulb 114. The command may include a predetermined amount of time over which the light bulb 114 is to remain on. After the predetermined amount of time, the lamp socket assembly 102A may turn off the light bulb 114. Alternatively, the information may include the schedule data 212, which the processor(s) 222 may store in the memory 224 as the schedule data 234 in block 565. Then, in block 570, the lamp socket assembly 102A may control operation of the light bulb 114 in accordance with the schedule data 234. In other words, the instructions 208 may cause the processor(s) 222 to read the schedule data 234 and instruct the switch 228 to turn the light bulb 114 on and off in accordance with the schedule defined by the schedule data 234.

The schedule data 212 and/or 234 may define a schedule for a randomized pattern that simulates a specific use case, such as the user 156 (see FIG. 1) being home while the user 156 is actually on vacation. In other words, the schedule data 212 and/or 234 may be used to define different modes of operation, including a vacation mode, for example. While the lamp socket assembly(ies) 102 has/have been described as being installed outside, one or more of the lamp socket assembly(ies) 102 may installed inside and the schedule may be used to turn the light bulbs 114 off and on in a manner that simulates the user 156 being home.

The second method 550 may be used by the client application 154 to allow the user 156 to turn the light bulb 114 on and off directly. For example, the user 156 may use the client application 154 to instruct the image capture device 132 to send a notification or command to the lamp socket assembly 102A instructing the lamp socket assembly 102A to turn on the light bulb 114. In block 555, the client application 154 communicates the message to the image capture device 132. The message includes a command to turn on the light bulb 114. In block 560, the instructions 208 when executed by the processor 204 cause the processor 204 to send the information (e.g., the command) to the lamp socket assembly 102A. The lamp socket assembly 102A receives the information in block 565. Then, in block 570, the lamp socket assembly 102A turns on the light bulb 114. The command may include a predetermined amount of time over which the light bulb 114 is to remain on and the lamp socket assembly 102A may turn off the light bulb 114 after the predetermined amount of time has elapsed. Alternatively, the light bulb 114 may remain on until the user 156 uses the client application 154 to instruct the image capture device 132 to send a notification or command to the lamp socket assembly 102A instructing the lamp socket assembly 102A to turn off the light bulb 114. After this occurs, the instructions 208 when executed by the processor 204 cause the processor 204 to send the command to the lamp socket assembly 102A, which receives the command and turns off the light bulb 114.

The second method 550 may be used by the server application 160 to turn the light bulb 114 on and off by sending a message to the image capture device 132 in block 555. Optionally, the second method 550 may be used by the third-party application 174 to turn the light bulb 114 on and off by sending a message to the image capture device 132 in block 555.

Referring to FIG. 1, the lamp socket assembly 102A may be inexpensive and easy to install. For example, the lamp socket assembly 102A may be installed by removing the light bulb 114 from the light socket 110 if the light bulb 114 is installed in the light socket 110. Then, the connector portion 124 of the lamp socket assembly 102A is installed in the light socket 110. Next, the light bulb 114 is installed in the light receptacle portion 120 of the lamp socket assembly 102A. The image capture device 132 is placed in a desired location with a view of the region that the user 156 wishes to surveil. Then, the second connector 134 is connected to the first connector 130 of the lamp socket assembly 102A (e.g., by the cable 136). The image capture device 132 is configured to communicate with the lamp socket assembly 102A over the connection formed by the first and second connectors 130 and 134 using a communication protocol, such as a standard communication protocol like USB communication protocol. As mentioned above, the lamp socket assembly 102A powers the image capture device 132 via the fourth electrical connection and uses information captured by the image capture device 132 and communicated to the lamp socket assembly 102A via the communication connection to control the operation of the light bulb 114. The lamp socket assembly 102A may also automatically discover and form a network with one or more like lamp socket assemblies 102B-102E (see FIGS. 3 and 4).

Figure 3:
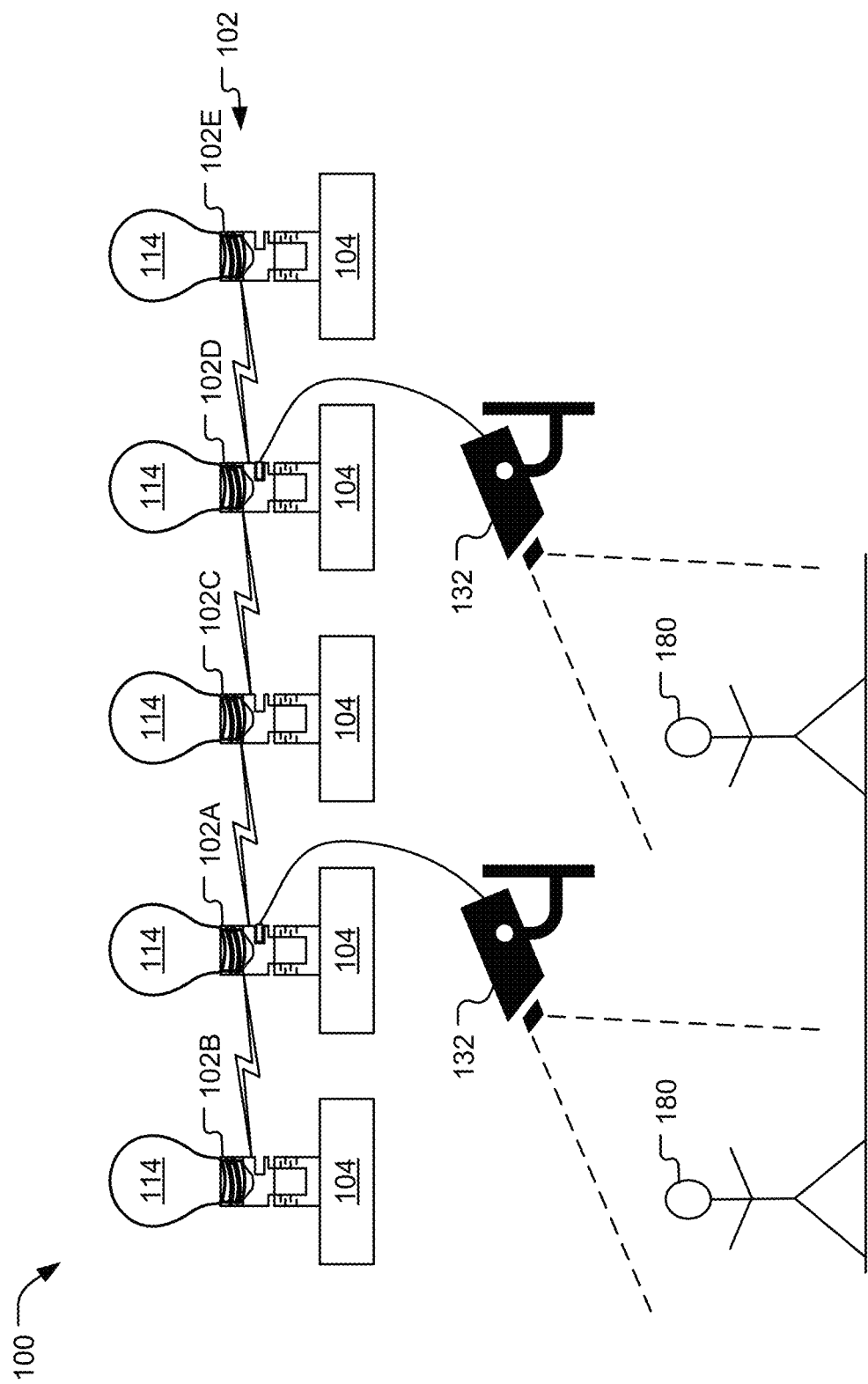
FIG. 3 is a block diagram of an embodiment of the security system including multiple lamp socket assemblies.
Figure 4:
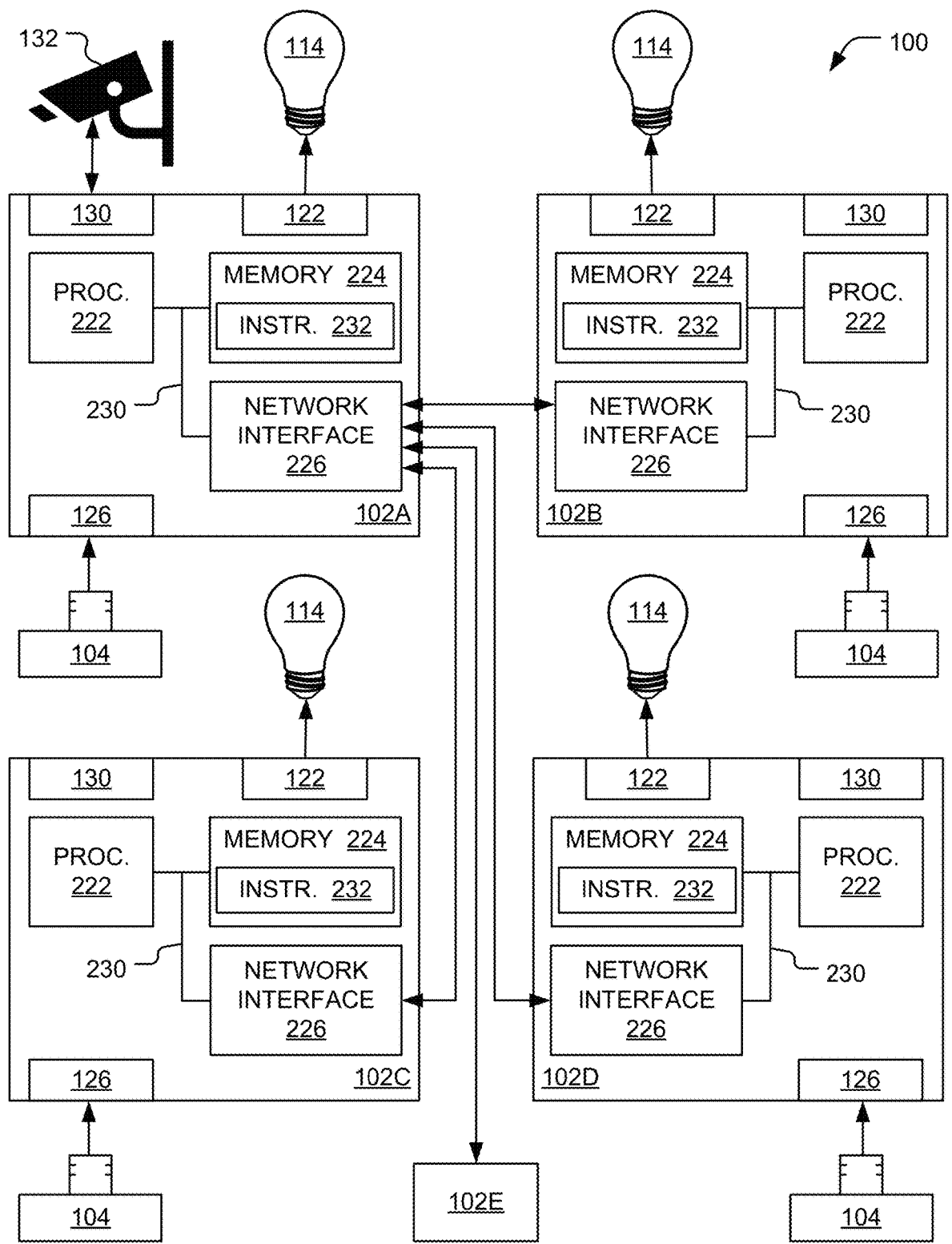
FIG. 4 is a block diagram illustrating a network formed by the multiple lamp socket assemblies.

FIG. 3 illustrates an embodiment of the system 100 in which the lamp socket assembly (ies) 102 include five lamp socket assemblies 102A-102E. However, the system 100 may include any number of lamp socket assemblies desired. In FIG. 3, the lamp socket assemblies 102A-102E are connected to one another wirelessly via their respective antennas 236 (see FIG. 2) and network interfaces 226 (see FIGS. 2 and 4). The lamp socket assemblies 102A-102E may communicate with one another over their respective network interfaces 226 using any suitable communication protocol, such as WIFI communication protocol, Bluetooth communication protocol, and the like. By way of a non-limiting example, when a first one of the lamp socket assemblies 102A-102E is powered up or turned on, the first lamp socket assembly automatically searches for any of the lamp socket assemblies 102A-102E within communication range (e.g., a second lamp socket assembly). When the first lamp socket assembly locates or discovers one or more of the lamp socket assemblies 102A-102E (e.g., the second lamp socket assembly), the first lamp socket assembly automatically pairs with each lamp socket assembly discovered and forms a network with the discovered lamp socket assembly as well as any of the lamp socket assemblies 102A-102E paired with the discovered lamp socket assembly. Thus, the lamp socket assemblies 102A-102E may be paired and grouped together automatically after they are turned on. This pairing may occur within a predetermined amount of time (e.g., within x seconds). In other words, after each of the lamp socket assemblies 102A-102E is turned on, each of the lamp socket assemblies 102A-102E may be allotted only the predetermined amount of time to discover any others of the lamp socket assemblies 102A-102E within communication range. In the example illustrated in FIG. 4, the five lamp socket assemblies 102A-102E are grouped or networked together. In this example, the instructions 232, when executed by the at least one processor 222 of the lamp socket assembly 102A, cause the at least one processor 222 to discover each of the lamp socket assemblies 102B-102E able to pair with the lamp socket assembly 102A within a predetermined amount of time after the lamp socket assembly 102A is turned on. For example, the lamp socket assembly 102A is able to discover the lamp socket assemblies 102B-102E within the predetermined amount of time when the lamp socket assemblies 102B-102E are turned on and within communication range of the lamp socket assembly 102A.

Whenever the image capture device 132 connected to one of the lamp socket assemblies 102A-102E sends a command to one of the lamp socket assemblies 102A-102E connected to the image capture device 132, the connected lamp socket assembly forwards the command to the others of the lamp socket assemblies 102A-102E. Thus, a single camera may control all of the lamp socket assemblies 102A-102E. Further, fewer than all of the lamp socket assemblies 102A-102E may be connected to different image capture devices 132. For example, in FIG. 3, only the lamp socket assemblies 102A and 102D are each connected to a different image capture device 132. By way of a non-limiting example, the lamp socket assembly 102A may wirelessly broadcast a command received from the image capture device 132 (that is connected to the lamp socket assembly 102A) to others of the lamp socket assemblies 102B-102E with which the lamp socket assembly 102A is grouped. In this manner, whenever a particular one of the image capture devices 132 detects a security event (e.g., motion), the particular lamp socket assembly connected to the particular image capture device will notify all of the other lamp socket assemblies with which the particular lamp socket assembly is grouped and all of the lamp socket assemblies in that group will turn on their respective light bulb 114.

Referring to FIG. 1, at least one image capture device 132 and at least one of the lamp socket assemblies 102 may be packaged and sold together in a kit. The kit may optionally include the cable 136. The client application 154 may be downloaded from the computing device(s) 162 over the network 140 and may automatically discover the image capture device(s) 132 over the network 140. For example, the kit may include instructions for connecting the client application 154 to the image capture device(s) 132 and establishing communication therebetween.

Mobile Communication Device

Figure 6:
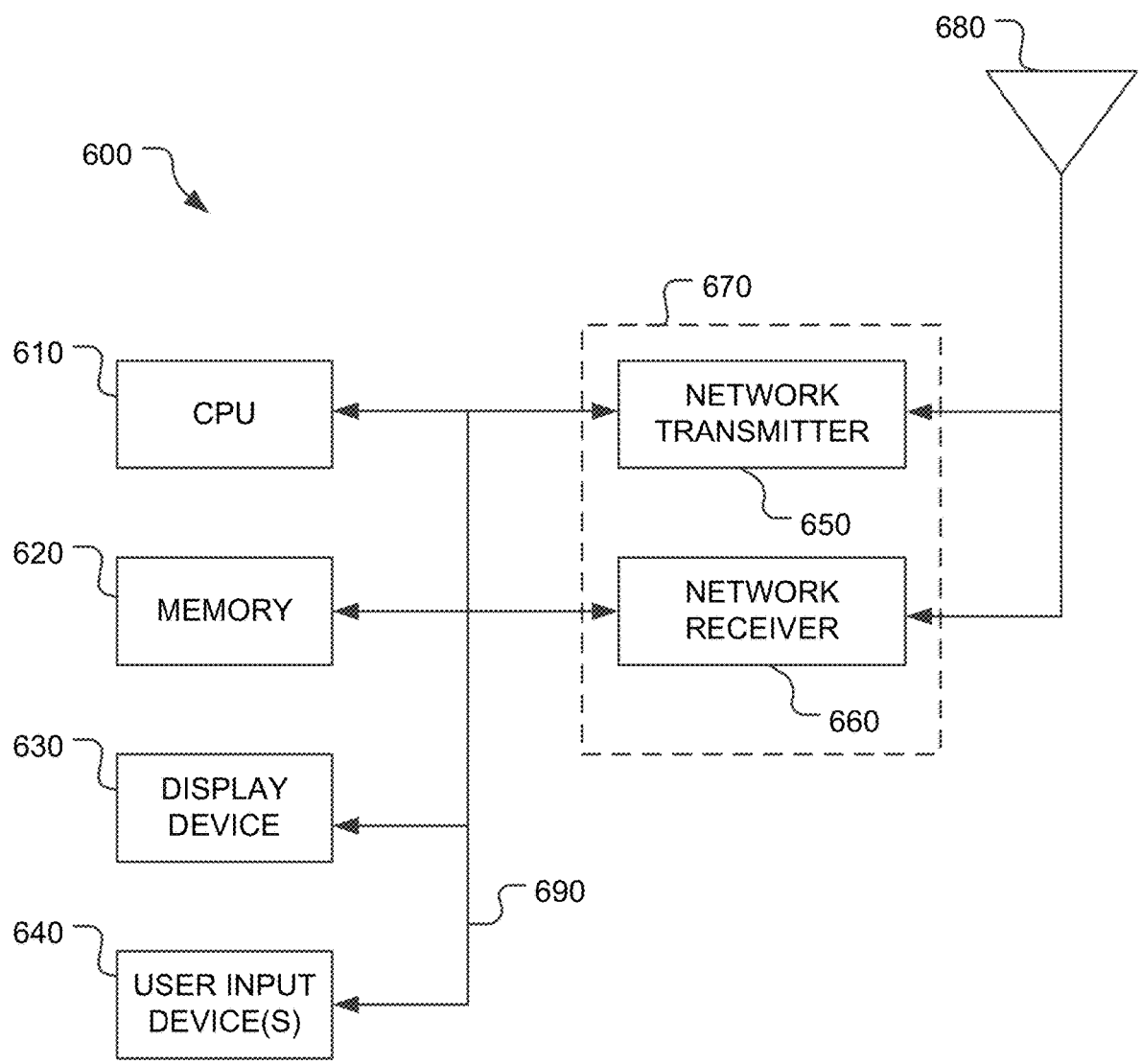
FIG. 6 is a functional block diagram illustrating a mobile communication device that may be used to implement at least one client computing device of FIG. 1.

FIG. 6 is a functional block diagram illustrating the mobile communication device 600 that may be used to implement the client computing device 150 of FIG. 1. By way of non-limiting examples, referring to FIG. 6, the mobile communication device 600 may be implemented as a cellular telephone, a tablet computer, and the like. The mobile communication device 600 includes a central processing unit ("CPU") 610. Those skilled in the art will appreciate that the CPU 610 may be implemented as a conventional microprocessor, application specific integrated circuit ("ASIC"), digital signal processor ("DSP"), programmable gate array ("PGA"), or the like. The mobile communication device 600 is not limited by the specific form of the CPU 610.

The mobile communication device 600 also contains the memory 620. The memory 620 may store instructions and data to control operation of the CPU 610. The memory 620 may include random access memory, read-only memory, programmable memory, flash memory, and the like. The mobile communication device 600 is not limited by any specific form of hardware used to implement the memory 620. The memory 620 may also be integrally formed in whole or in part with the CPU 610.

The mobile communication device 600 also includes conventional components, such as the display device 630 and one or more user input devices 640 (e.g., buttons, a keypad, a keyboard, and the like). These are conventional components that operate in a known manner and need not be described in greater detail. The display device 630 may be implemented as a touch display or touchscreen configured to receive user input (e.g., selections described above with respect to the second method 550 illustrated in FIG. 5B, and the like). The display device 158 (see FIG. 1) may be implemented as the display device 630.

The mobile communication device 600 also includes a network transmitter 650 such as may be used by the mobile communication device 600 for normal network wireless communication with the network 140 (see FIG. 1), such as with a base station (not shown) of a cellular network. FIG. 6 also illustrates a network receiver 660 that operates in conjunction with the network transmitter 650 to communicate with the network 140 (see FIG. 1), such as with the base station (not shown) of the cellular network. In a typical embodiment, the network transmitter 650 and network receiver 660 are implemented as a network transceiver 670. The network transceiver 670 is connected to an antenna 680. Operation of the network transceiver 670 and the antenna 680 for communication with the network 140 (see FIG. 1) is well-known in the art and need not be described in greater detail herein.

Returning to FIG. 6, other conventional components found in wireless communication devices, such as a USB interface, Bluetooth interface, camera/video device, infrared device, global positioning system ("GPS") device, and the like, may also be included in the mobile communication device 600. For the sake of clarity, these conventional elements are not illustrated in the functional block diagram of FIG. 6. The GPS device may be used to determine the current geographic location (e.g., latitude and longitude) of the mobile communication device 600.

The various components illustrated in FIG. 6 are coupled together by a bus system 690. The bus system 690 may include an address bus, data bus, power bus, control bus, and the like. For the sake of convenience, the various busses in FIG. 6 are illustrated as the bus system 690.

In some embodiments, the memory 620 stores computer executable instructions that when executed by one or more processors (e.g., the CPU 610) cause the one or more processors to implement the client application 154 and/or perform all or portions of one or more of the methods (including the second method 550 illustrated in FIG. 5B) described above. Such instructions may be stored on one or more non-transitory computer-readable media.

Computing Device

Figure 7:
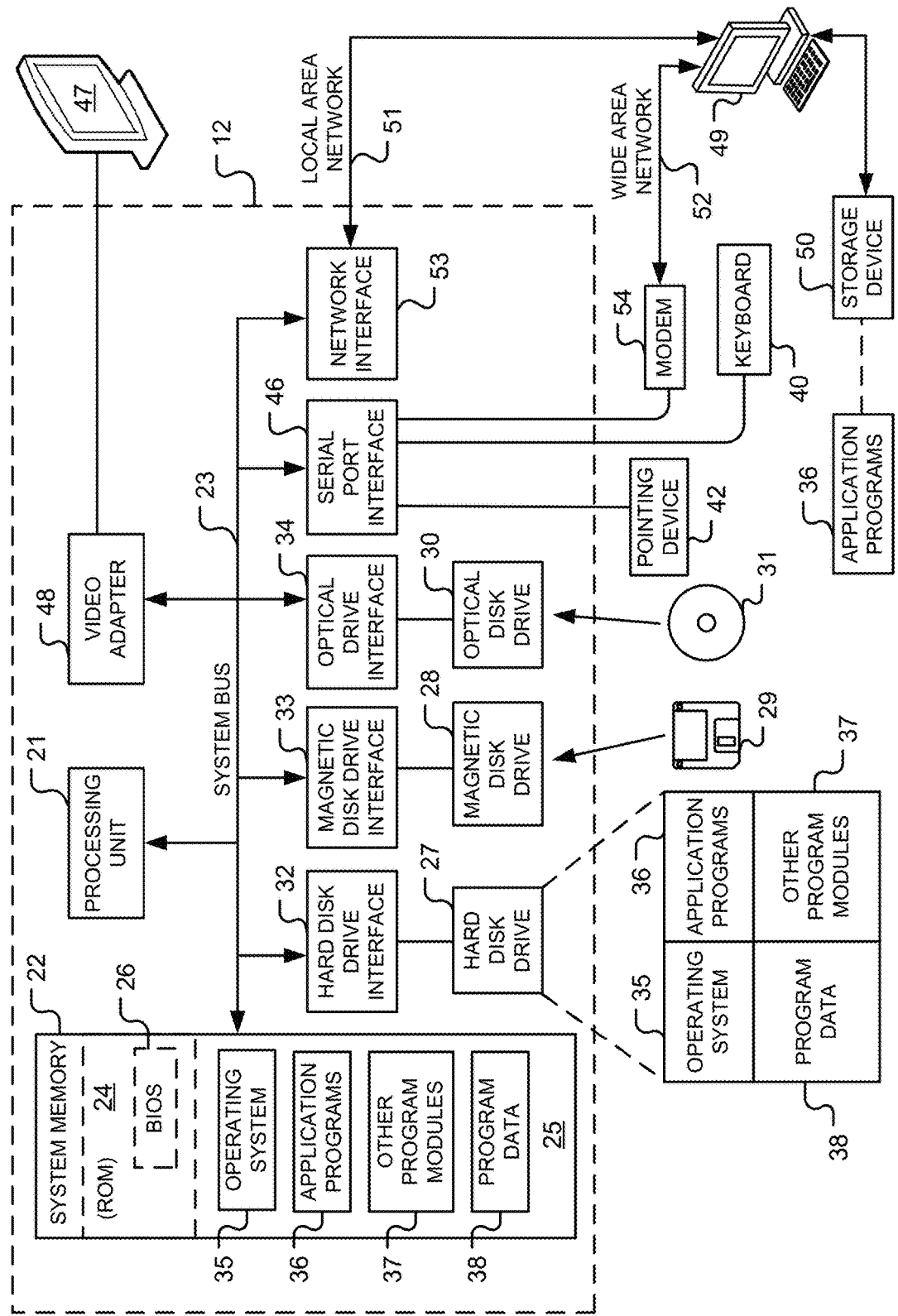
FIG. 7 is a diagram of a hardware environment and an operating environment in which computing devices of the security system of FIG. 1 may be implemented.

FIG. 7 is a diagram of hardware and an operating environment in conjunction with which implementations of the one or more computing devices of the system 100 (see FIG. 1) may be practiced (e.g., the client computing device 150, the computing device(s) 162, and/or the third-party computing device(s) 170). The description of FIG. 7 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 7 includes a general-purpose computing device in the form of the computing device 12. Each of the computing devices of FIG. 1 (including the client computing device 150, the computing device(s) 162, and/or the third-party computing device(s) 170) may be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 7 include a local-area network (LAN) 51 and a wide-area network (WAN) 52. Such networking environments are commonplace in offices, enterprise-wide computer networks, intranets and the Internet. The network 140 (see FIG. 1) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to implement an application (e.g., the client application 154, the server application 160, and/or the third-party application 174) and/or perform all or portions of one or more of the methods (including the second method 550 illustrated in FIG. 5B) described above. Such instructions may be stored on one or more non-transitory computer-readable media.

At least one embodiment of the disclosure can be described in view of the following clauses:

1. A lamp socket assembly for use with a light bulb, a light socket, and a surveillance device, the lamp socket assembly comprising: a connector portion to be received and powered by the light socket; a light receptacle portion to receive the light bulb; a connector to be connected to the surveillance device and provide power thereto; at least one processor; and memory comprising instructions to be executed by the at least one processor, the instructions when executed by the at least one processor causing the at least one processor to receive a notification from the surveillance device via the connector and cause the light receptacle portion to provide power to the light bulb in response to the notification to thereby turn on the light bulb.

2. The lamp socket assembly of clause 1, wherein the instructions, when executed by the at least one processor, cause the at least one processor to cause the light receptacle portion to stop providing power to the light bulb after a predetermined amount of time to thereby turn off the light bulb.

3. The lamp socket assembly of clauses 1 or 2 for use with at least one different lamp socket assembly each like the lamp socket assembly, the lamp socket assembly further comprising: a network interface to communicate with a different network interface of each of the at least one different lamp socket assembly, the notification being a first notification, the instructions, when executed by the at least one processor, causing the at least one processor to communicate a second notification to each of the at least one different lamp socket assembly via the network interface, the second notification being based at least in part on the first notification, each of the at least one different lamp socket assembly turning on a different light bulb in response to receiving the second notification.

4. The lamp socket assembly of clause 3, wherein the network interface of the lamp socket assembly is operable to communicate with the different network interface of each of the at least one different lamp socket assembly using a Bluetooth protocol.

5. The lamp socket assembly of clauses 3 or 4, wherein the instructions, when executed by the at least one processor, cause the at least one processor to discover each of the at least one different lamp socket assembly within a predetermined amount of time after the lamp socket assembly is turned on.

6. The lamp socket assembly of any one of clauses 1-5, wherein the instructions, when executed by the at least one processor, cause the at least one processor to receive schedule information from the surveillance device and provide power to the light bulb in accordance with the schedule information.

7. The lamp socket assembly of any one of clauses 1-6 for use with a Universal Serial Bus ("USB") cable, wherein the connector is a USB connector comprising a USB port or a USB plug, and the USB connector is connectable to the surveillance device by the USB cable.

8. The lamp socket assembly of any one of clauses 1-7 for use with the light bulb comprising conductive first external threads and the light socket comprising conductive first internal threads, wherein the connector portion comprises conductive second external threads configured to threadedly engage the conductive first internal threads and form a first electrical connection therewith, and the light receptacle portion comprises conductive second internal threads configured to threadedly engage the conductive first external threads and form a second electrical connection therewith.

9. A system for use with a light socket, the system comprising: a lamp socket assembly to be installed between a light bulb and a light socket, the lamp socket assembly to receive first electrical power from the light socket when connected thereto, the lamp socket assembly comprising a connector; and a surveillance device to be connected to the connector and to receive second electrical power from the lamp socket assembly via the connector, the surveillance device to detect an occurrence of a security event and notify the lamp socket assembly of the occurrence, the lamp socket assembly to provide third electrical power to the light bulb in response to being notified of the occurrence to thereby turn on the light bulb.

10. The system of clause 9, wherein the surveillance device is an image capture device to capture images and detect the occurrence of the security event in the images.

11. The system of clause 10, wherein the image capture device is to record sound and detect the occurrence of the security event in the images based at least in part on the sound.

12. The system of clauses 10 or 11 for use with a network, the system further comprising: communication equipment connectable to the network, the image capture device comprising a communication interface to connect with the communication equipment.

13. The system of clause 12, further comprising: a computing device comprising at least one processor and memory storing instructions to be executed by the at least one processor, the instructions when executed by the at least one processor causing the at least one processor to send a command to the surveillance device over the network to turn on the light bulb, the surveillance device to send a message to the lamp socket assembly after receiving the command, the lamp socket assembly to provide fourth electrical power to the light bulb after receiving the message to thereby turn on the light bulb.

14. The system of clause 12, further comprising: a computing device comprising at least one processor and memory storing instructions to be executed by the at least one processor, the instructions when executed by the at least one processor causing the at least one processor to send a schedule to the surveillance device over the network, the surveillance device to send the schedule to the lamp socket assembly, the lamp socket assembly to provide fourth electrical power to the light bulb in accordance with the schedule.

15. The system of any one of the clauses 9-14, wherein the connector is a first Universal Serial Bus ("USB") connector comprising a first USB port or a first USB plug, the surveillance device comprises a second USB connector comprising a second USB port or a second USB plug, and the system further comprises: a USB cable connectable to the first and second USB connectors to thereby connect the surveillance device to the connector.

16. The system of any one of the clauses 9-15, wherein the lamp socket assembly is a first lamp socket assembly, the light bulb is a first light bulb, and the system further comprises: at least one second lamp socket assembly to be connected to the first lamp socket assembly via a wireless connection, the first lamp socket assembly to send a message to each of the at least one second lamp socket assembly after being notified of the occurrence, each of the at least one second lamp socket assembly to provide fourth electrical power to a different second light bulb in response to the message to turn on the different second light bulb.

17. The system of clause 16, wherein the first lamp socket assembly is to discover each of the at least one second lamp socket assembly within a predetermined amount of time after the first lamp socket assembly is turned on.

18. A kit comprising: a lamp socket assembly to be installed in a light socket and receive first electrical power from the light socket when installed therein, the lamp socket assembly comprising a light socket portion to receive a light bulb; and a surveillance device to receive second electrical power from the lamp socket assembly, detect an occurrence of a security event, and notify the lamp socket assembly of the occurrence, the lamp socket assembly to provide third electrical power to the light bulb in response to being notified of the occurrence to thereby turn on the light bulb.

19. The kit of clause 18, further comprising: a cable to connect the surveillance device to the lamp socket assembly.

20. The kit of clause 19, wherein the lamp socket assembly comprises a first Universal Serial Bus ("USB") connector, the surveillance device comprises a second USB connector, and the cable comprises a third USB connector to be connected to the first USB connector and a fourth USB connector to be connected to the second USB connector.

21. The kit of any one of the clauses 18-20, wherein the surveillance device comprises a video camera.

22. The kit of any one of the clauses 18-21, wherein the surveillance device is to receive messages over a network and provide information to the lamp socket assembly based at least in part on the messages.

23. The kit of any one of the clauses 18-22, wherein the lamp socket assembly is a first lamp socket assembly, the light bulb is a first light bulb, and the kit further comprises: a second lamp socket assembly to form a network with the first lamp socket assembly, the first lamp socket assembly to send a message to the second lamp socket assembly after being notified of the occurrence, the second lamp socket assembly to provide fourth electrical power to a second light bulb to thereby turn on the second light bulb after receiving the message.

24. The kit of clause 23, wherein the first lamp socket assembly is to discover the second lamp socket assembly within a predetermined amount of time after the first lamp socket assembly is turned on when the second lamp socket assembly is turned on and within communication range of the first lamp socket assembly.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

As used herein, a term joining items in a series (e.g., the term "or," the term "and," or the like) does not apply to the entire series of items, unless specifically stated otherwise or otherwise clearly contradicted by context. For example, the phrase "a plurality of A, B, and C" (with or without the Oxford comma) refers to a subset including at least two of the recited items in the series. Thus, the phrase refers to (1) at least one A and at least one B but not C, (2) at least one A and at least one C but not B, (3) at least one B and at least one C but not A, and (4) at least one A and at least one B and at least one C. Similarly, the phrase "a plurality of A, B, or C" (with or without the Oxford comma) refers to a subset including at least two of the recited items in the series. Thus, this phrase also refers to (1) at least one A and at least one B but not C, (2) at least one A and at least one C but not B, (3) at least one B and at least one C but not A, and (4) at least one A and at least one B and at least one C.

By away of another example, Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A lamp socket assembly for use with a light bulb, a light socket, and a surveillance device, the lamp socket assembly comprising:
   a connector portion to be received and powered by the light socket;
   a light receptacle portion to receive the light bulb;
   a first connector positioned between the connector portion and the light receptacle portion, the first connector to receive a corresponding connector of a cable comprising a second connector to be connected to a third connector of the surveillance device and provide power to the cable to be conducted thereby to the surveillance device, the cable to be detachable from the first connector and the surveillance device;
   at least one processor; and
   memory comprising instructions to be executed by the at least one processor, the instructions when executed by the at least one processor causing the at least one processor to receive a notification from the surveillance device via the first connector and cause the light receptacle portion to provide power to the light bulb in response to the notification to thereby turn on the light bulb.

2. The lamp socket assembly of claim 1, wherein the instructions, when executed by the at least one processor, cause the at least one processor to cause the light receptacle portion to stop providing power to the light bulb after a predetermined amount of time to thereby turn off the light bulb.

3. The lamp socket assembly of claim 1 for use with at least one different lamp socket assembly each like the lamp socket assembly, the lamp socket assembly further comprising:
a network interface to communicate with a different network interface of each of the at least one different lamp socket assembly, the notification being a first notification, the instructions, when executed by the at least one processor, causing the at least one processor to communicate a second notification to each of the at least one different lamp socket assembly via the network interface, the second notification being based at least in part on the first notification, each of the at least one different lamp socket assembly turning on a different light bulb in response to receiving the second notification.

4. The lamp socket assembly of claim 3, wherein the network interface of the lamp socket assembly is operable to communicate with the different network interface of each of the at least one different lamp socket assembly using a Bluetooth protocol.

5. The lamp socket assembly of claim 3, wherein the instructions, when executed by the at least one processor, cause the at least one processor to discover each of the at least one different lamp socket assembly within a predetermined amount of time after the lamp socket assembly is turned on.

6. The lamp socket assembly of claim 1, wherein the instructions, when executed by the at least one processor, cause the at least one processor to receive schedule information from the surveillance device and provide power to the light bulb in accordance with the schedule information.

7. The lamp socket assembly of claim 1, wherein the first connector is a first USB connector comprising a USB port or a USB plug, and
the third connector is a second USB connector.

8. The lamp socket assembly of claim 1 for use with the light bulb comprising conductive first external threads and the light socket comprising conductive first internal threads, wherein the connector portion comprises conductive second external threads configured to threadedly engage the conductive first internal threads and form a first electrical connection therewith, and
the light receptacle portion comprises conductive second internal threads configured to threadedly engage the conductive first external threads and form a second electrical connection therewith.

9. A system for use with a light socket, the system comprising:
a lamp socket assembly to be installed between a light bulb and a light socket, the lamp socket assembly to receive first electrical power from the light socket when connected thereto, the lamp socket assembly comprising a first connector to receive a corresponding connector of a cable comprising a second connector; and
a surveillance device comprising a third connector to be connected to the second connector of the cable and to receive second electrical power from the lamp socket assembly via the second connector, the surveillance device to detect an occurrence of a security event and notify the lamp socket assembly of the occurrence, the lamp socket assembly to provide third electrical power to the light bulb in response to being notified of the occurrence to thereby turn on the light bulb.

10. The system of claim 9, wherein the surveillance device is an image capture device to capture images and detect the occurrence of the security event in the images.

11. The system of claim 10, wherein the image capture device is to record sound and detect the occurrence of the security event in the images based at least in part on the sound.

12. The system of claim 10 for use with a network, the system further comprising:
communication equipment connectable to the network, the image capture device comprising a communication interface to connect with the communication equipment.

13. The system of claim 12, further comprising:
a computing device comprising at least one processor and memory storing instructions to be executed by the at least one processor, the instructions when executed by the at least one processor causing the at least one processor to send a command to the surveillance device over the network to turn on the light bulb, the surveillance device to send a message to the lamp socket assembly after receiving the command, the lamp socket assembly to provide fourth electrical power to the light bulb after receiving the message to thereby turn on the light bulb.

14. The system of claim 12, further comprising:
a computing device comprising at least one processor and memory storing instructions to be executed by the at least one processor, the instructions when executed by the at least one processor causing the at least one processor to send a schedule to the surveillance device over the network, the surveillance device to send the schedule to the lamp socket assembly, the lamp socket assembly to provide fourth electrical power to the light bulb in accordance with the schedule.

15. The system of claim 9, wherein the first connector is a first Universal Serial Bus ("USB") connector comprising a first USB port or a first USB plug, the third connector is a second USB connector comprising a second USB port or a second USB plug, and the system further comprises:
the cable, which is a USB cable connectable to the first and second USB connectors to thereby connect the surveillance device to the connector.

16. The system of claim 9, wherein the lamp socket assembly is a first lamp socket assembly, the light bulb is a first light bulb, and the system further comprises:
at least one second lamp socket assembly to be connected to the first lamp socket assembly via a wireless connection, the first lamp socket assembly to send a message to each of the at least one second lamp socket assembly after being notified of the occurrence, each of the at least one second lamp socket assembly to provide fourth electrical power to a different second light bulb in response to the message to turn on the different second light bulb.

17. The system of claim 16, wherein the first lamp socket assembly is to discover each of the at least one second lamp socket assembly within a predetermined amount of time after the first lamp socket assembly is turned on.

18. A kit comprising:
a lamp socket assembly to be installed in a light socket and receive first electrical power from the light socket when installed therein, the lamp socket assembly comprising a light socket portion to receive a light bulb, and a first connector to be coupled to a second connector of a cable comprising a third connector; and a surveillance device comprising a fourth connector to be coupled to the third connector of the cable to receive second electrical power from the lamp socket assembly, detect an occurrence of a security event, and notify the lamp socket assembly of the occurrence, the lamp socket assembly to provide third electrical power to the light bulb in response to being notified of the occurrence to thereby turn on the light bulb.

19. The kit of claim 18, further comprising:
the cable.

20. The kit of claim 19, wherein
the first connector is a first Universal Serial Bus ("USB") connector,
the fourth connector is a second USB connector,
the second connector is a third USB connector to be connected to the first USB connector, and
the third connector is a fourth USB connector to be connected to the fourth USB connector.

21. The kit of claim 18, wherein the surveillance device comprises a video camera.

22. The kit of claim 18, wherein the surveillance device is to receive messages over a network and provide information to the lamp socket assembly based at least in part on the messages.

23. The kit of claim 18, wherein the lamp socket assembly is a first lamp socket assembly, the light bulb is a first light bulb, and the kit further comprises:
a second lamp socket assembly to form a network with the first lamp socket assembly, the first lamp socket assembly to send a message to the second lamp socket assembly after being notified of the occurrence, the second lamp socket assembly to provide fourth electrical power to a second light bulb to thereby turn on the second light bulb after receiving the message.

24. The kit of claim 23, wherein the first lamp socket assembly is to discover the second lamp socket assembly within a predetermined amount of time after the first lamp socket assembly is turned on when the second lamp socket assembly is turned on and within communication range of the first lamp socket assembly.

* * * * *